Figure 3:
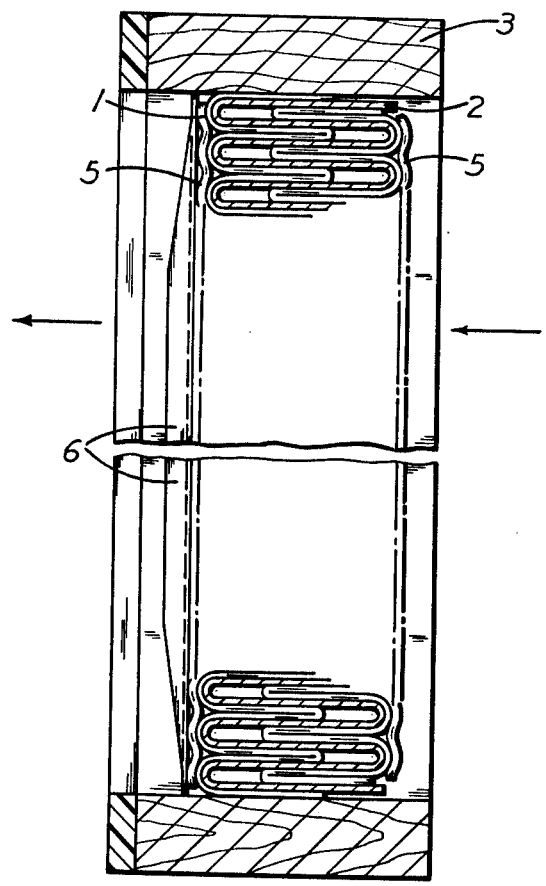

United States Patent [19]

Smith et al.

[11] 4,147,524
[45] Apr. 3, 1979

[54] FILTER UNIT

[75] Inventors: Wayne L. Smith, Bradfordwoods; Roger P. Wolf, Mars, both of Pa.

[73] Assignee: Mine Safety Appliances Company, Pittsburgh, Pa.

[21] Appl. No.: 899,085

[22] Filed: Apr. 24, 1978

[51] Int. Cl.² ............................................. B01D 46/52
[52] U.S. Cl. ..................................... 55/521; 55/499; 55/500
[58] Field of Search ................................. 55/499–501, 55/521; 210/487, 493 R, 493 FR

[56] References Cited

U.S. PATENT DOCUMENTS

| | | | |
|---|---|---|---|
| 2,206,684 | 7/1940 | Yant | 55/521 X |
| 2,915,426 | 12/1959 | Poelman | 210/493 R X |
| 3,870,495 | 3/1975 | Dixson et al. | 55/521 X |
| 3,871,851 | 3/1975 | Neumann | 55/521 |

*Primary Examiner*—Frank W. Lutter
*Assistant Examiner*—Kathleen J. Prunner
*Attorney, Agent, or Firm*—Brown, Flick & Peckham

[57] ABSTRACT

A plurality of laterally spaced parallel tapes extend along each side of a strip of filter material in engagement with it, and the sheets and tapes are in accordion folded form so that there is a stack of integrally connected parallel filter sheets spaced apart by the portions of the tapes between them. Each tape has at its side of the stack exposed portions, along which a line of hardened adhesive extends to connect them and form a stiffening band, whereby there are parallel stiffening bands extending across each side of the stack of filter sheets.

2 Claims, 3 Drawing Figures

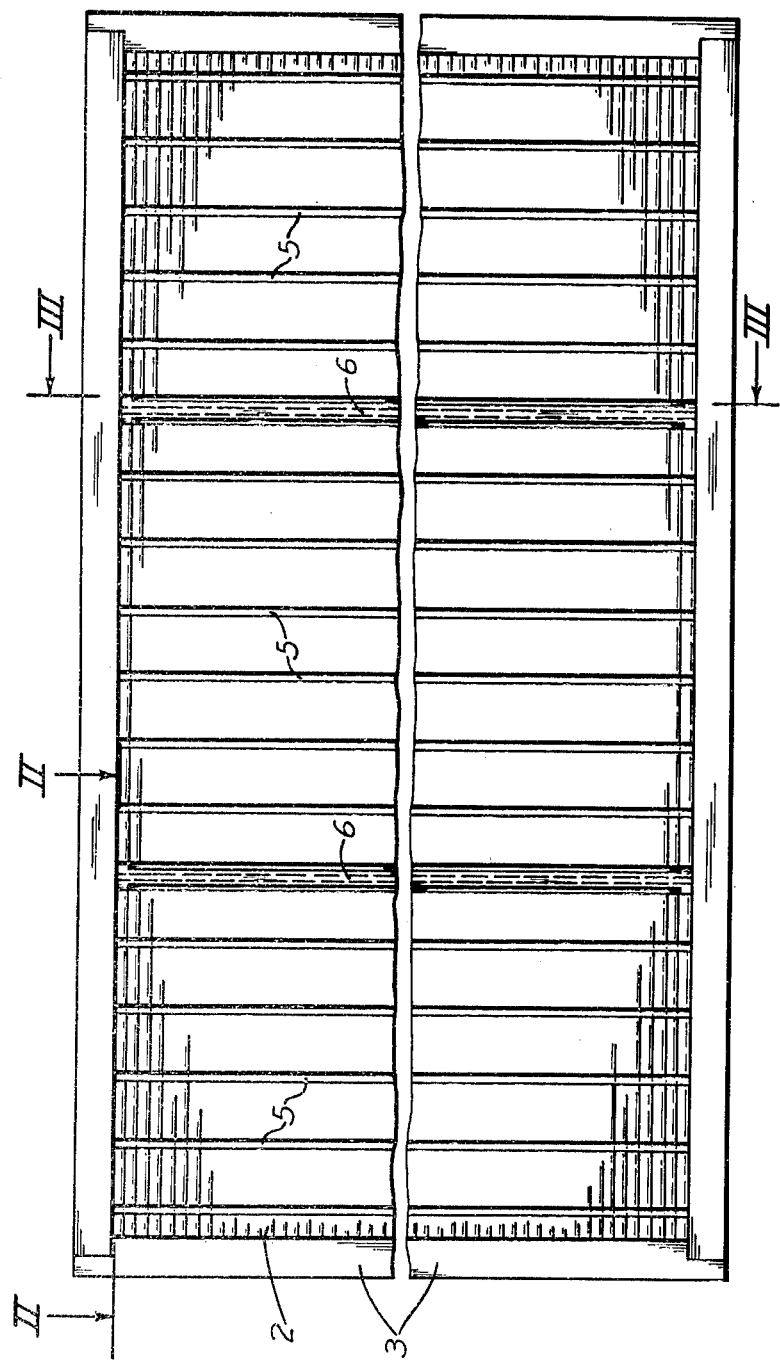
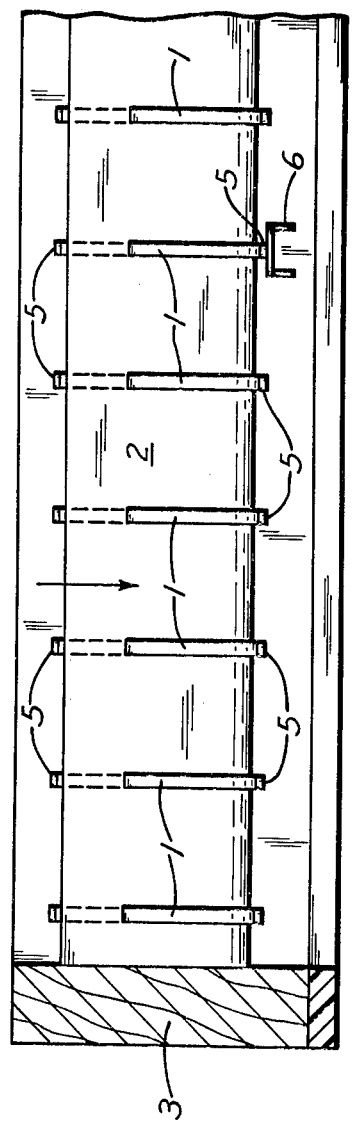

FILTER UNIT

In one type of filter unit a strip of filter material, such as filter paper, is accordion folded or pleated to form a stack of substantially parallel filter sheets. One way of separating the sheets from one another is by means of tapes. Thus, before the filter strip is pleated, a plurality of laterally spaced parallel tapes are secured to each side of the strip so that they, too, will be accordion folded when the strip is pleated. This provides a folded portion of each tape between each pair of adjoining filter sheets. The unit then is mounted in a frame that supports it. However, while the unit is being handled before framing, it does not have much rigidity, so it may open up to some extent. Also, after the unit has been mounted in a frame, strong gas pressure against one side of the unit may cause it to bow or bulge in the opposite direction.

It is among the objects of this invention to provide an accordion folded filter unit which is relatively stiff, which is held in its folded configuration and which will resist deformation by a stream of gas passing through it.

The preferred embodiment of the invention is illustrated in the accompanying drawings, in which FIG. 1 is a front view of the filter;

FIG. 2 is an enlarged fragmentary horizontal section taken on the line II—II of FIG. 1; and FIG. 3 is an enlarged vertical section taken on line III—III of FIG. 1.

One way of forming the filter unit is to start with a strip of filter material of any desired width, such as filter paper, along each side of which laterally spaced parallel tapes of any suitable material have been laid and attached by an adhesive or other suitable means. Then the strip and the tapes are accordion folded as a unit transversely thereof to form a stack of integrally connected, substantially parallel, filter sheets that are spaced apart by double thickness of the folded portions of the tapes between them. Or, the folding of the filter strip and the tapes may be done separately and then the tapes are inserted between the filter sheets. In either case, the tapes extend the full width of the individual sheets. However, it is preferred that they extend less than the full width so that they will avoid any interference with the folding of the filter strip or any tendency to cause it to tear at the folds. This means that the tapes 1 shown in FIG. 3 will be shorter than the filter strip 2 and cannot be attached to it before folding. The tapes can either be folded into the folds of the strip as it is being folded, or they can be folded separately and then inserted in the folded strip.

Since each tape extends around the outside of each fold of the filter strip, a row of curved exposed portions of the tape is formed. When viewed from an end of the unit or in vertical section as in FIG. 3, the line of exposed portions gives each tape an undulating appearance. The filter unit is housed in a rectangular frame 3, through which air flows in the direction of the arrows seen in FIGS. 2 and 3.

It is a feature of this invention that the exposed tape portions just mentioned are connected by connecting means extending across the stack of filter sheets. This connecting means is a line of adhesive 5 that is applied along the exposed portion of each tape from top to bottom of the filter unit and then allowed to harden. The hardened adhesive forms a stiffening band, with the result that each side of the stack of filter sheets is provided with a plurality of parallel stiffening bands, which also hold the filtered material in its folded condition before it is inserted in the frame. The bands stiffen the filter to make it easier to handle and also to minimize or prevent it from bulging when the pressure of the air passing through it otherwise would deform the unit.

To further stiffen the unit, rigid bars 6 may extend along some of the stiffening bands. The adhesive that forms the stiffening bands may be used to hold the bars in place if desired. The bars may take various forms, such as metal channels or the like.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A filter unit comprising a strip of filter material, a plurality of laterally spaced parallel tapes extending along each side of the strip in engagement therewith, the strip and tapes being accordion-folded transversely thereof and forming a stack of integrally connected parallel filter sheets spaced apart by the portions of the tapes between them, each tape having at its side of the stack exposed portions, and a line of hardened adhesive extending along said exposed portions of each tape to connect them and form a stiffening band, whereby there are parallel stiffening bands extending across each side of said stack of filter sheets.

2. A filter unit according to claim 1, including a plurality of laterally spaced rigid bars extending along some of said stiffening bands at only one side of said stack and adhering thereto.

* * * * *